(12) United States Patent
Kochar et al.

(10) Patent No.: US 6,658,548 B1
(45) Date of Patent: Dec. 2, 2003

(54) SYSTEM AND METHOD IN A DATA PROCESSING SYSTEM FOR EXTRACTING DATA FROM A PROTECTED REGION OF MEMORY

(75) Inventors: Sumeet Kochar, Durham, NC (US); Mary Joan McHugh, Newton, CT (US); James Gerard Palte, Apex, NC (US); Dan Edward Poff, Mahopac, NY (US); Robert Saccone, Jr., Glen Head, NY (US); Charles Otto Schulz, Ridgefield, CT (US); Robert Brett Tremaine, Stormville, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/480,760

(22) Filed: Jan. 10, 2000

(51) Int. Cl.[7] ............................................. G06F 12/00
(52) U.S. Cl. ...................... 711/202; 711/201; 711/203; 711/205; 711/207; 708/203; 710/68
(58) Field of Search ................................ 711/202, 203, 711/205, 207; 707/101; 708/203; 710/68

(56) References Cited

U.S. PATENT DOCUMENTS

| 4,881,075 A | 11/1989 | Weng | 341/87 |
|---|---|---|---|
| 5,414,850 A | 5/1995 | Whiting | 395/700 |
| 5,506,580 A | 4/1996 | Whiting et al. | 341/51 |
| 5,532,694 A | 7/1996 | Mayers et al. | 341/67 |
| 5,539,202 A | 7/1996 | Geagan et al. | 250/369 |
| 5,649,151 A | 7/1997 | Chu et al. | 395/438 |
| 5,734,892 A | 3/1998 | Chu | 395/612 |
| 5,812,817 A | 9/1998 | Hovis et al. | 395/497.04 |

Primary Examiner—Donald Sparks
Assistant Examiner—Ngoc V Dinh
(74) Attorney, Agent, or Firm—Bracewell & Patterson LLP

(57) ABSTRACT

A system and method for extracting data from a protected region of memory loads at least a first part of extraction code into physical memory and, thereafter, activates a memory mapping facility that maps a real memory onto the physical memory and prevents programs from accessing a protected memory region of the physical memory. At least a second part of the extraction code is then loaded into the virtual memory utilizing the memory mapping facility. The extraction code is then executed to deactivate the memory mapping facility and to copy data from the protected memory region to a second physical memory region, such that reactivating the memory mapping facility will cause a real memory region to be mapped onto the second physical memory region.

16 Claims, 4 Drawing Sheets

SYSTEM AND METHOD IN A DATA PROCESSING SYSTEM FOR EXTRACTING DATA FROM A PROTECTED REGION OF MEMORY

BACKGROUND OF THE INVENTION

1. Technical Field

The present invention relates in general to data processing systems and in particular to data processing systems with protected regions of memory. Still more particularly, the present invention relates to systems and methods for extracting data from a protected region of the memory of a data processing system.

2. Description of the Related Art

Years ago, programs typically accessed the memory of a data processing system by utilizing memory addresses that directly specified physical memory locations. For example, the Intel 8086 processor supports a "real mode" of operation, which allows programs to utilize such a direct memory access method. Subsequent processors, such as the Intel 80286 and higher processors, also support "protected mode" operation, which provides a virtual memory that is translated (or mapped) onto the physical memory of the data processing system by a memory manager. When operating in protected mode, the memory manager interprets any programmatic references to memory as references to virtual memory addresses, rather than physical memory addresses. Consequently, programs executing in protected mode cannot directly access physical memory, and even indirect access to physical memory (i.e., access to physical memory via virtual memory) is limited for any particular program to the physical memory onto which that program's virtual memory is mapped. As far as that program is concerned, the rest of the physical memory of the data processing system is inaccessible (or protected).

Preventing programs from accessing certain regions of physical memory often serves useful purposes, particularly in contexts such as multitasking and memory compression. The present invention recognizes, however, that the ability to analyze data that is stored in protected regions of physical memory can sometimes be useful, particularly for the people who design hardware and software for managing memory.

SUMMARY OF THE INVENTION

In order to permit selective access to protected memory, the present invention introduces a method, system, and program product that loads at least a first part of extraction code into physical memory and, thereafter, activates a memory mapping facility that maps a virtual memory onto the physical memory and prevents programs from accessing a protected memory region of the physical memory. At least a second part of the extraction code is then loaded into the real memory utilizing the memory mapping facility. The extraction code is then executed to deactivate the memory mapping facility and copy data from the protected memory region to a second physical memory region, such that subsequent reactivation of the memory mapping facility will cause a virtual memory region to be mapped onto the second physical memory region.

All objects, features, and advantages of the present invention will become apparent in the following detailed written description, when considered with the following claims.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF ILLUSTRATIVE EMBODIMENT

Figure 1:
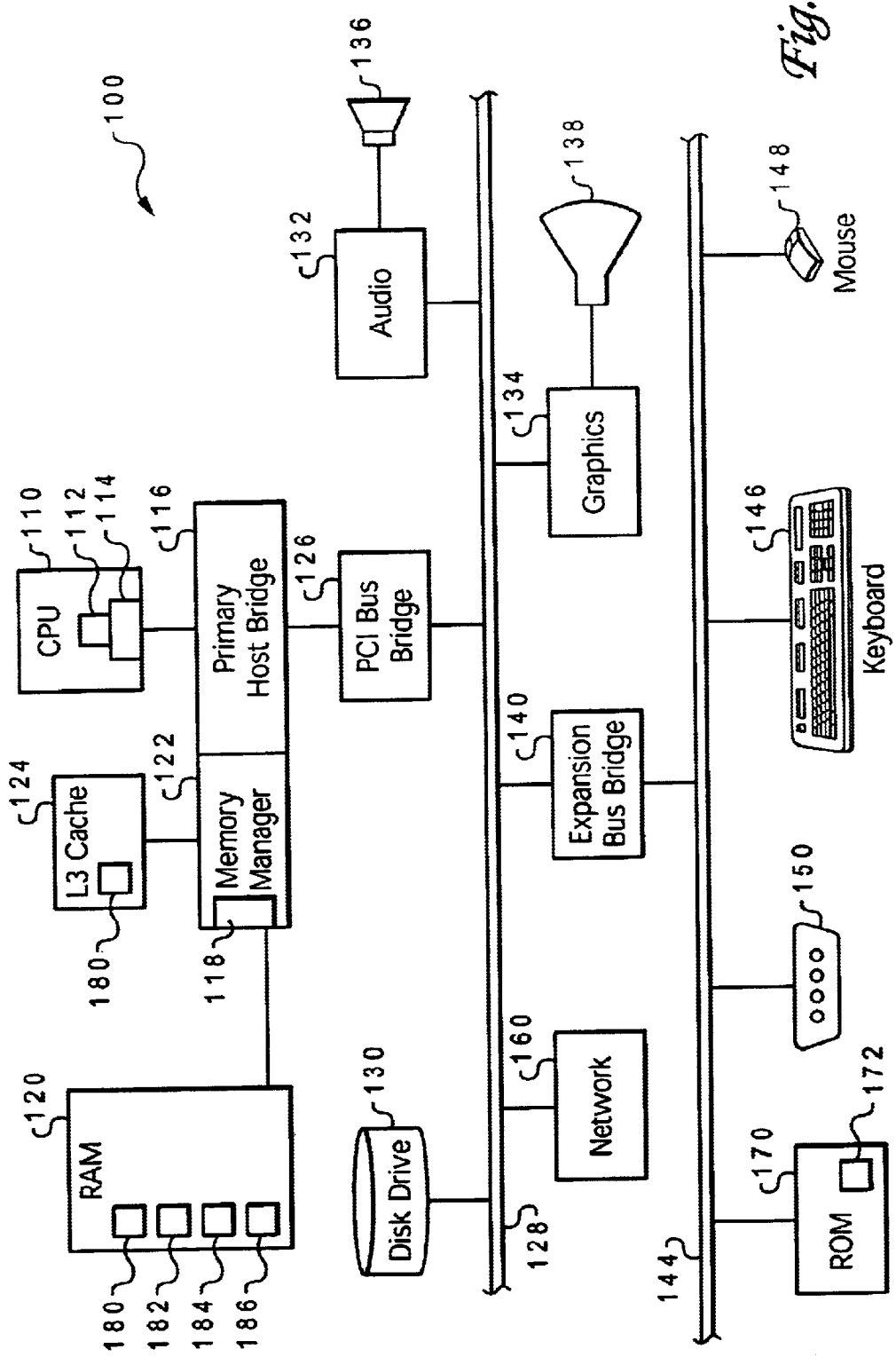
FIG. 1 depicts a block diagram of an illustrative embodiment of a data processing system with facilities for retrieving data from a protected region of physical memory according to the present invention.

With reference now to the figures, and in particular with reference to FIG. 1, there is depicted an illustrative data processing system 100 with facilities for retrieving data from a protected region of physical memory according to the present invention. Data processing system 100 includes at least one central processing unit (CPU) 110, and CPU 110 includes cache memory, such as L1 cache 112 and L2 cache 114, for storing data that CPU 110 may access rapidly.

Also included in data processing system 100 is random access memory (RAM) 120, and RAM 120 is linked to CPU 110 via a primary host bridge 116 that provides a memory manager 122 including a memory mapping facility, such as a compression engine 118. Memory manager 122 utilizes compression engine 118 to create a "virtual memory" that is larger (i.e., provides more memory addresses) than RAM 120. (i.e., the "physical memory"). Accordingly, when software executing on CPU 110 references a particular memory address, compression engine 118, when active, interprets that address as a virtual memory address and automatically translates the real address into a corresponding, but different, physical memory address.

Primary host bridge 116 is also connected to an L3 cache 124, which delivers data to CPU 110 more rapidly than RAM 120 does, but less rapidly than L1 cache 112 and L2 cache 114 do. In the illustrative embodiment, RAM 120 has a capacity of 512 megabytes (MB), L3 cache 124 has a capacity of 32 MB, and L1 cache 112 and L2 cache 114 have capacities of under 32 MB, however the present invention is not limited to those specific memory capacities. L3 cache 124 allows compression engine 118 to translate virtual addresses into address rapidly by obviating the need to access RAM 120. Further, if L3 cache 124 is subsequently disabled, memory manager 122 avoids the performance degradation associated with accessing CTT 180 from RAM 120 by automatically deactivating compression engine 118, which eliminates virtual memory and causes memory manager to interpret subsequent references to memory by CPU 110 as references to physical memory locations in RAM 120.

A peripheral component interconnect (PCI) local bus 128 is linked to primary host bridge 116 via a PCI bus bridge 126. Attached to PCI local bus 128 are one or more non-volatile data storage devices, such as a disk drive 130, as well as an audio adapter 132 and a graphics adapter 134 for controlling audio output through a speaker 136 and visual output through a display device 138, respectively. An expansion bus bridge, such as a PCI-to-ISA bus bridge 140, connects PCI local bus 128 to an ISA bus 144, which is attached (through appropriate adapters) to a keyboard 146 and a mouse 148. Additional non-volatile memory, such as read-only memory or electrically erasable programmable read-only memory, (referred to generically herein as ROM 170) is also connected to ISA bus 144.

Data processing system 100 also includes one or more data ports for communicating with other data processing systems. The data port(s) may include, without limitation, a serial port 150 attached to ISA bus 144 for linking data processing system 100 to a remote data processing system (not illustrated) via a modem (not illustrated) and/or a network adapter 160 attached to PCI local bus 128 for connecting data processing system 100 to a local area network (not illustrated).

In addition, data processing system 100 contains software programs that are stored on the data storage devices and loaded into CPU 110 for execution. Among those programs is a startup routine 172, which is retrieved from ROM 170 upon activation or reactivation (i.e., booting or rebooting) of data processing system 100 and executed by CPU 110 to prepare data processing system 100 for operation by performing tasks such as activating compression engine 118 and invoking the operating system (OS). In the illustrative embodiment, data processing system 100 is booted to a DOS OS.

Figure 2:
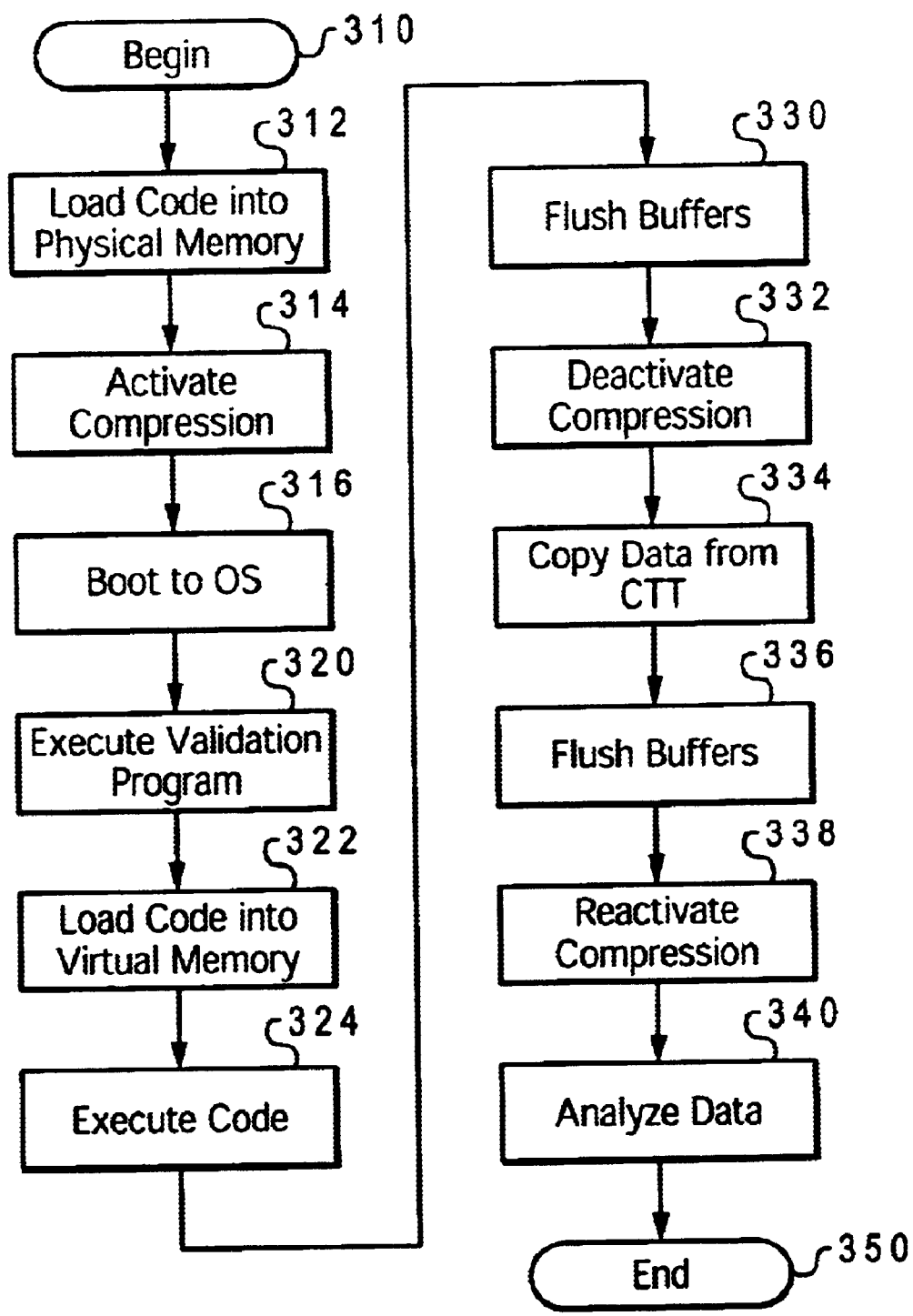
FIG. 2 is a high level logical flowchart depicting an exemplary process according to the present invention for extracting data from a protected memory region.

Referring now also to FIG. 2, there is illustrated a logical flowchart describing an exemplary process according to the present invention for extracting data from a protected memory region. The process begins at block 310 with data processing system 100 beginning to execute startup routine 172. The process then passes to block 312, which shows startup routine 172 loading a set of instructions (i.e., extraction code 182) into physical memory starting at byte 768. Startup routine 172 then finishes by activating compression engine 118 and starting the OS, as illustrated at blocks 314 and 316, respectively. Activating compression engine 118 includes the steps of enabling L3 cache 124, loading a compression translation table (CTT) 180 into RAM 120 and L3 cache 124, and configuring compression engine 118 to leave uncompressed the memory region into which the OS is loaded (i.e., the first megabyte of virtual memory). In the illustrative embodiment, CTT 180 contains one 16-byte entry for each 1024 bytes of physical memory in data processing system 100. CTT 180 therefore occupies 8 MB of physical memory.

After data processing system 100 has finished booting, a validation program 184 is executed from virtual memory, as shown at block 320. Validation program 184 then loads a second copy 186 of extraction code 182 into virtual memory at an address equal to the physical address of the first copy, but that is mapped by the compression engine to a different physical address, as illustrated at block 322.

Figure 3A:
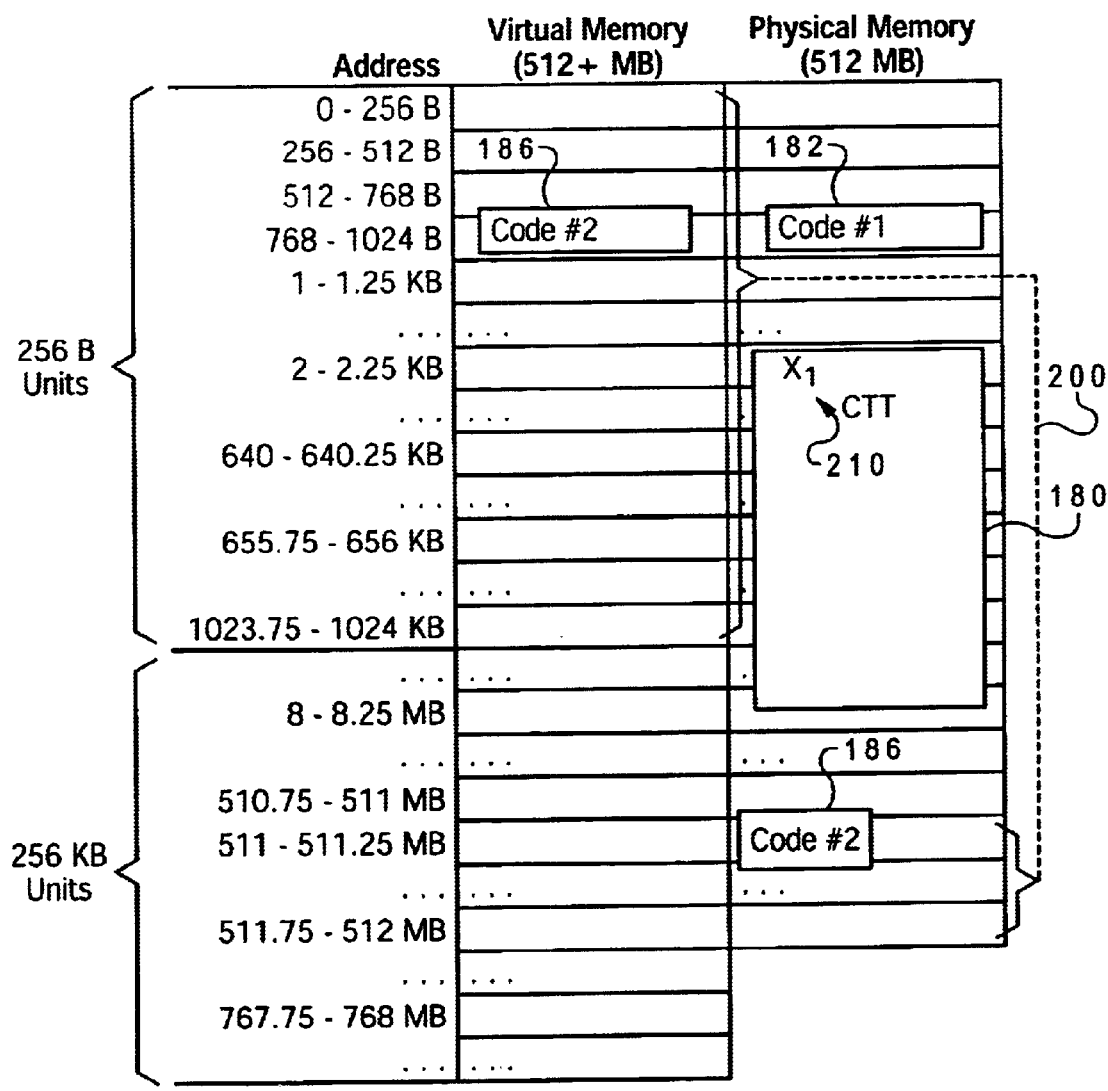
FIG. 3A illustrates an exemplary map of the memory of the data processing system of FIG. 1 after the memory mapping facility has been activated but before the. data of interest has been retrieved from the protected region of physical memory.

With reference now also to FIG. 3A, there is illustrated an exemplary map of the physical memory and the virtual memory of the data processing system of FIG. 1 after data processing system 100 has been booted and compression engine 118 activated. As shown, second copy 186 occupies a region of virtual memory starting at byte 768. As also shown, in the illustrative embodiment, compression engine 118 maps the first megabyte of virtual memory to the last megabyte of physical memory, as indicated by the dashed line 200. Accordingly, second copy 186 also occupies a region of physical memory.

As FIG. 3A also illustrates, physical memory also contains both CTT 180, which occupies 8 megabytes starting at byte 2048 (800 hex), and the copy of extraction code 182 that was loaded before compression was activated. Compression engine 118 utilizes data from CTT 180 (such as data 210) to translate virtual memory addresses into physical memory addresses. Accordingly, the data in CTT 180 is critical to the tasks of verifying that memory manager 122 and compression engine 118 are operating correctly and troubleshooting memory manager 122 and compression engine 118 when improper operation is suspected. However, when compression engine 118 is active, it interprets all memory references from CPU 110 as references to virtual addresses and maps those virtual addresses to physical addresses that are not occupied by CTT 180. The region of physical memory occupied by CTT 180 is thus protected. As explained below, second copy 186 overcomes that protection by deactivating compression.

Referring again to FIG. 2, after loading second copy 186 into virtual memory, validation program 184 passes control to the instruction at byte 768 of virtual memory by calling second copy 186, as shown at block 324. As illustrated at block 330, second copy 186 then flushes L1 cache 112, L2 cache 114, and L3 cache 124, thereby ensuring that physical memory contains an accurate copy of CTT 180. Then, second copy 186 deactivates compression engine 118 by disabling L3 cache 124, as shown at block 332.

Executing a program that deactivates compression would ordinarily be problematical, however, since deactivating compression causes memory manager 122 to abruptly discontinue mapping virtual addresses to physical addresses and, instead, treat all memory references as direct references to physical addresses. Under ordinary circumstances, therefore, deactivating compression while a program is executing would prevent that program from completing successfully, as CPU 110 would attempt to load the next instruction from a particular address in virtual memory, but virtual memory would no longer exist. The next "instruction" (or memory contents that CPU 110 expects to be an instruction) would instead come from a physical address other than the physical address to which the virtual memory address had been mapped.

For instance, as illustrated, the instruction from second copy 186 of extraction code 182 that causes compression to be deactivate comes from a virtual address in the vicinity of byte 768 of virtual memory, perhaps byte 810. However, if CPU 110 attempts to retrieve the next instruction from byte 811, for example, memory manager 122 would interpret that address as a physical address. Consequently, the next "instruction" would come from physical byte 811, not the physical byte to which virtual byte 811 had been mapped.

Deactivating compression does not disturb the present invention, however, because a first copy of extraction code 182 was loaded starting at physical byte 768 before second copy 186 was called. Consequently, when second copy 186 deactivates compression and thereby causes extraction code 182 to begin executing from physical memory, physical byte 811 will contain a copy of the instruction expected following virtual byte 810.

A problem presented by this approach, however, is that only the first 2048 bytes of virtual memory correspond to usable bytes of physical memory, in that CTT 180 occupies the remainder of the first megabyte of physical memory. Consequently, any instructions that might be loaded into physical memory before compression is activated must be loaded into the first 2048 bytes. Otherwise, when compression is activated and CTT 180 is created, those instructions might be altered. In addition, the OS utilizes much of the first megabyte of virtual memory, including all of the region from byte 0 to byte 2048. However, the region from byte 768 to byte 1024 is utilized as an interrupt vector table, and it is possible to load instructions into that region without disrupting the OS.

Another challenge is therefore presented, however, in that the size of extraction code 182 is limited to 256 bytes, which is insufficient to store enough instructions to thoroughly analyze any data obtained from CTT 180. The present invention addresses that challenge by calling extraction code 182 from validation program 184 executing from virtual memory. As a result, however, compression must be reactivated before extraction code 182 returns control to validation program 184, but reactivating compression protects CTT 180.

As shown at block 334, extraction code 182 ensures that validation program 184 will have access to data 210, even though CTT 180 will be protected, by storing a copy 220 of data 210 in a region of physical memory that will be accessible via virtual memory after compression is reactivated. In the illustrative embodiment, copy 220 contains 16 kilobytes of data from CTT 180 and is stored starting 640 kilobytes into megabyte 511. Consequently, after compression has been reactivated, validation program 184 will be able to find data 220 starting at real kilobyte 640.

After extraction code 182 has stored copy 220, the process passes to block 336, which depicts extraction code 182 flushing L1 cache 112 and L2 cache 114 again, and then to block 338, which depicts extraction code 182 reactivating compression engine 118 and second copy 186 returning control to validation program 184. As illustrated at block 340, validation program 184 then analyzes copy 220 of CTT data 210, and the process then terminates at block 350.

Figure 3B:
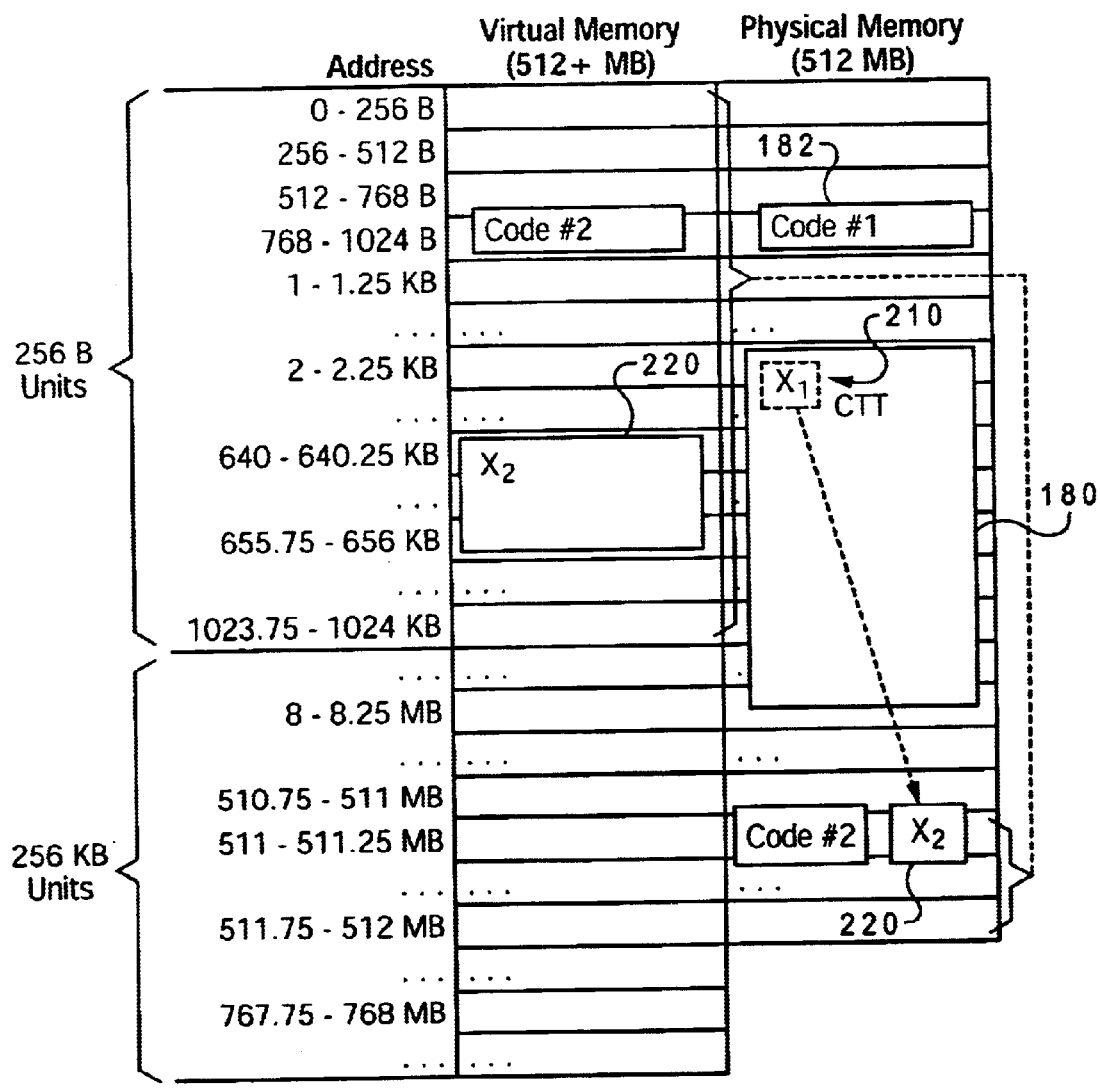
FIG. 3B depicts an exemplary map of the memory of the data processing system of FIG. 1 after the data of interest has been extracted from the protected memory region.

With reference now to FIG. 3B, there is depicted an exemplary map of the physical memory and the virtual memory of the data processing system of FIG. 1 after copy 220 has been stored in physical memory and compression has been reactivated. In addition to the contents depicted in FIG. 3A, physical memory includes copy 220 starting 640 kilobytes into megabyte 511, and, by virtue of the mapping function of compression engine 118, virtual memory includes copy 220 starting at kilobyte 640.

As has been described, the present invention provides means for analyzing data from a protected memory region. Towards that end, the present invention loads two copies of extraction code into memory, one before a mapping facility is activated and the second after the mapping facility is activated, such that execution of the extraction code will not be disrupted when the mapping facility is reactivated. The present invention then deactivates the mapping facility, copies data from the protected memory region to region that will be unprotected, and reactivates the mapping facility.

While the invention has been particularly shown and described with reference to an illustrative embodiment, it will be understood by those skilled in the art that various changes in form and detail may be made therein without departing from the spirit and scope of the invention. For example, although the extraction code that is loaded directly into physical memory has been described as a copy of the code that is loaded into virtual memory, those codes need not be identical, as execution will not be disturbed as long as the copies allow the memory manager to retrieve the appropriate instructions that follow deactivation of the mapping facility from physical memory. For example, the instructions up to and including the instruction that deactivates compression need not actually be present in physical memory, as long as the instructions that follow the deactivation instruction have the correct offset from byte 768.

Also, although the illustrative embodiment has been described in terms of a personal computer, the present invention could as well be implemented on other types of data processing systems, including, without limitation, mainframe computers and mini-computers. Further, although specific hardware components and memory addresses have been utilized to describe the illustrative embodiment, the present invention should be understood to include alternative embodiments adapted to provide access to data from protected memory regions of data processing systems with other hardware and software configurations.

Furthermore, although aspects of the present invention have been described with respect to a computer system executing software that directs the functions of the present invention, it should be understood that present invention may alternatively be implemented as a program product for use with a data processing system. Programs defining the functions of the present invention can be delivered to a data processing system via a variety of signal-bearing media, which include, without limitation, non-rewritable storage media (e.g., CD-ROM), rewritable storage media (e.g., a floppy diskette or hard disk drive), and communication media, such as digital and analog networks. It should be understood, therefore, that such signal-bearing media, when carrying or encoding computer readable instructions that direct the functions of the present invention, represent alternative embodiments of the present invention.

What is claimed is:

1. A method, within a data processing system having a physical memory and a virtual memory for accessing data from a protected region of the physical memory, said method comprising:

loading an executable first code into a physical memory;

activating a memory mapping facility to prevent software from accessing a protected memory region of said physical memory;

mapping a virtual memory onto said physical memory, said virtual memory including a range of addresses associated with a second executable code stored in said physical memory, said second executable code having common code with said first executable code, said range of addresses including at least one same address in said virtual memory as said first code in said physical memory such that an interruption of an execution of said second executable code due to a deactivation of said memory mapping facility results in execution of said first executable code;

executing said second executable code to deactivate said memory mapping facility;

while said memory mapping facility is inactive, executing said first executable code to copy data from said protected memory region to a second physical memory region; and reactivating said memory mapping facility to map said data from said second physical memory region into said virtual memory.

2. A method according to claim 1, wherein:

said second executable code includes a deactivating instruction for deactivating said memory mapping facility;

said first executable code includes an extraction instruction; and said step of executing said second executable code to deactivate said memory mapping facility comprises executing said deactivation instruction from said virtual memory, wherein executing said first executable code to copy data comprises executing said extraction instruction from said physical memory.

3. A method according to claim 1, wherein:

said memory mapping facility comprises a compression engine to compress said virtual memory into said physical memory;

said physical memory comprises a protected memory region that includes a table that is utilized by said compression engine; and said step of executing said extraction code comprises copying data from said table.

4. A method according to claim 3, wherein said step of executing said first executable code to copy data includes copying at least 1024 contiguous bytes of said data from said protected memory region.

5. A method according to claim 3 and further comprising:

analyzing said data in said second physical memory region.

6. A data processing system with physical memory and facilities for accessing data from a protected region of the physical memory, said data processing system comprising:

a processor, a physical memory, and a memory mapping facility in communication with said processor and said physical memory, wherein, when active, said memory mapping facility maps a virtual memory onto said physical memory and prevents software from accessing a protected memory region of said physical memory;

an executable first code stored in said physical memory; and an executable second code stored in said virtual memory, such that, if executed, said extraction code deactivates said memory mapping facility and copies data from said protected memory region to a second physical memory region while said memory manger is inactive, and such that reactivating said memory manger will cause a second physical memory region to be mapped into a virtual memory region.

7. A data processing system according to claim 6, wherein:

said second executable code includes a deactivating instruction for deactivating said memory mapping facility; and said first executable code includes an extraction instruction, such that, if said extraction code is executed, said processor retrieves said deactivating instruction from said virtual memory and said extraction instruction from said physical memory.

8. A data processing system according to claim 6, wherein:

said memory mapping facility comprises a compression engine;

said physical memory comprises a protected memory region that includes a table that is utilized by said compression engine; and if executed, said extraction code copies said data from said table.

9. A data processing system according to claim 6, wherein said extraction code, if executed, copies at least 1024 contiguous bytes of said data from said protected memory region.

10. A data processing system according to claim 6, wherein:

if executed, said extraction code also reactivates said memory mapping facility after said data has been copied to said second physical memory region; and said data processing system further comprises validation code for analyzing said data in said virtual memory region.

11. A computer program product within a computer usable medium for accessing data from a protected memory region of a physical memory of a data processing system having a memory mapping facility, said computer program product comprising:

instructions for loading an executable first code into a physical memory;

instructions for activating a memory mapping facility to prevent software from accessing a protected memory region of said physical memory;

instructions for mapping a virtual memory onto said physical memory, said virtual memory including a range of addresses associated with a second executable code stored in said physical memory, said second executable code having common code with said first executable code, said range of addresses including at least one same address in said virtual memory as said first code in said physical memory, such that an interruption of an execution of said second executable code due to a deactivation of said memory mapping facility results in execution of said first executable code;

instructions for executing said second executable code to deactivate said memory manning facility;

instructions for, while said memory mapping facility is inactive, executing said first executable code to copy data from said protected memory region to a second physical memory region; and instructions for reactivating said memory mapping facility to map said data from said second physical memory region into said virtual memory.

12. The computer program product according to claim 11, wherein:

said second executable code includes a deactivating instruction for deactivating said memory mapping facility; and said first executable code includes an extraction instruction, such that, if said extraction code is executed, said deactivating instruction is retrieved from said virtual memory and said extraction instruction is retrieved from said physical memory.

13. The computer program product according to claim 11, wherein:

said memory mapping facility comprises a compression engine to compress said virtual memory into said physical memory;

said physical memory comprises a protected memory region that includes a table that is utilized by said compression engine; and if executed, said extraction code copies said data from said table.

14. The computer program product according to claim 11, wherein said first executable code, if executed, copies at least 1024 contiguous bytes of said data from said protected memory region.

15. The computer program product according to claim 11, wherein:

said computer program product further comprises validation code for analyzing said data in said second physical memory region.

16. A method for analyzing data from a protected memory region in a physical memory, said method comprising:

loading a first copy of an extraction code into a physical memory at a physical memory address;

activating a mapping facility that protects the physical memory from a write access;

mapping a second copy of the extraction code into a virtual memory at a virtual memory address that is the same as the physical memory address for the first copy of the extraction code, such that the first copy of the extraction code is capable of continuing execution of the extraction code from a point at which the second copy of the extraction code in the virtual memory is interrupted;

loading the second copy of the extraction code into the physical memory at an address that is different from the physical memory address of the first copy of the extraction code;

using the second copy of the extraction code to deactivate the mapping facility and thus unprotecting the physical memory, whereby the first copy of the extraction code in physical memory continues to execute from the point in the second copy of the extraction code where the extraction code was interrupted;

loading a copy of data from a compression translation table, loaded in the physical memory, into the physical memory while the physical memory is unprotected;

mapping the copy of data from the compression translation table into the virtual memory;

reactivating the compression engine; and analyzing the copy of data from the compression translation table.

* * * * *